United States Patent
Lee

(10) Patent No.: US 8,164,994 B2
(45) Date of Patent: Apr. 24, 2012

(54) APPARATUS FOR GENERATING TRACKING SIGNAL

(75) Inventor: Ki-Ho Lee, Suwon-si (KR)

(73) Assignee: Samsung Electonics Co., Ltd., Gyeonggi-do (KR)

( * ) Notice: Subject to any disclaimer, the term of this patent is extended or adjusted under 35 U.S.C. 154(b) by 1366 days.

(21) Appl. No.: 11/472,375

(22) Filed: Jun. 22, 2006

(65) Prior Publication Data

US 2006/0291603 A1    Dec. 28, 2006

(30) Foreign Application Priority Data

Jun. 27, 2005 (KR) .................. 10-2005-0055891

(51) Int. Cl.
G11B 5/09 (2006.01)
G11B 20/10 (2006.01)
G11B 20/14 (2006.01)
G11B 7/00 (2006.01)

(52) U.S. Cl. ............ 369/47.28; 369/59.12; 369/59.2; 369/124.14

(58) Field of Classification Search ........... 369/47.28, 369/59.12, 59.2, 124.14
See application file for complete search history.

(56) References Cited

U.S. PATENT DOCUMENTS

| | | | | |
|---|---|---|---|---|
| 5,258,968 A * | 11/1993 | Matsuda et al. | ............ | 369/44.35 |
| 5,444,680 A * | 8/1995 | Umezawa et al. | ......... | 369/59.19 |
| 5,671,200 A * | 9/1997 | Yamaguchi et al. | ....... | 369/44.28 |
| 5,748,587 A * | 5/1998 | Sim | ............................. | 369/47.45 |
| 5,768,234 A * | 6/1998 | Satomura | .................. | 369/59.19 |
| 5,882,371 A | 3/1999 | Miyazaki et al. | | |
| 6,014,354 A | 1/2000 | Nomura et al. | | |
| 6,501,717 B1 * | 12/2002 | Yamazaki | .................. | 369/47.16 |
| 6,683,478 B2 | 1/2004 | Yoo | | |
| 6,728,181 B2 * | 4/2004 | Shimoda et al. | ............. | 369/53.2 |
| 6,791,918 B1 * | 9/2004 | Tanishima | .................... | 369/47.1 |
| 6,940,799 B1 * | 9/2005 | Ma et al. | ..................... | 369/53.25 |
| 7,518,963 B2 * | 4/2009 | Tokuyama | ................. | 369/47.28 |
| 7,663,998 B2 * | 2/2010 | Nagata et al. | ............. | 369/53.34 |
| 2004/0257949 A1 * | 12/2004 | Hsu et al. | ..................... | 369/59.2 |
| 2005/0190671 A1 * | 9/2005 | Chen et al. | .................. | 369/47.27 |

FOREIGN PATENT DOCUMENTS

| | | |
|---|---|---|
| JP | 64-003828 | 1/1989 |
| JP | 64-081527 | 3/1989 |
| JP | 04-082025 | 3/1992 |

(Continued)

OTHER PUBLICATIONS

English-language translation of Preliminary Notice of the First Office Action dated Oct. 14, 2009, issued in corresponding Taiwanese Application No. 095122231.

*Primary Examiner* — Joseph Feild
*Assistant Examiner* — Aneeta Yodichkas
(74) *Attorney, Agent, or Firm* — Harness, Dickey & Pierce, P.L.C.

(57) ABSTRACT

A tracking signal generating apparatus includes a phase detector and a digital phase controller. The phase detector generates an up signal and a down signal which contain information regarding a phase difference between a plurality of square wave signals that have been generated from an optical signal. The digital phase controller generates an up limit signal or a down limit signal whose logic levels are controlled so that a phase difference between the up limit signal and the down limit signal is reduced.

23 Claims, 4 Drawing Sheets

FOREIGN PATENT DOCUMENTS

| | | |
|---|---|---|
| JP | 10-081527 | 3/1998 |
| JP | 10-124890 | 5/1998 |
| JP | 10-143882 | 5/1998 |
| JP | 10-340463 | 12/1998 |
| JP | 2003-209464 | 7/2003 |
| TW | 508569 | 11/2002 |

* cited by examiner

APPARATUS FOR GENERATING TRACKING SIGNAL

PRIORITY STATEMENT

This application claims the benefit of Korean Patent Application No. 10-2005-0055891, filed on Jun. 27, 2005 in the Korean Intellectual Property Office, the disclosure of which is incorporated herein in its entirety by reference.

BACKGROUND OF THE INVENTION

1. Field of the Invention

Example embodiments of the present invention relate in general to a tracking signal generating apparatus for optical signal reproduction, and to a digital phase controller of the apparatus.

2. Description of the Related Art

FIG. 1 is a schematic view of an optical reproducing apparatus 10. Referring to FIG. 1, the optical reproducing apparatus 10 includes a spindle motor 600 for rotating an optical disc 100. The optical disc 100 is an optical information storage medium. Apparatus 10 includes an optical pickup 200 which is movably installed in the radius direction of the optical disc 100 and reproduces information recorded on the optical disc 100. The apparatus 10 also includes a driver 400 for driving the spindle motor 600 and the optical pickup 200, a signal processor 300 for detecting various signals including a tracking signal using a detection signal received from an optical detector (not shown) of the optical pickup 200, and a controller 500 for controlling a tracking servo operation of the optical pickup 200 using a signal detected by the signal processor 300.

As data is to be stored in the optical disc 100, detecting a tracking signal is essential in performing a stable servo operation. Generally, when data is reproduced from an optical storage medium such as a digital versatile disk (DVD), a blue ray disk (BD), or a high-definition DVD (HD-DVD), a pit depth of the disc is set to a ¼ wavelength due to certain limitations in conventional tracking methods based on a given signal-to-noise ratio and certain compatibility with CDs, etc. Accordingly, since a push pull method (a conventional method primarily used for detecting a tracking signal in CDs) cannot be used, a differential phase detection (DPD) method is used for detecting a tracking signal.

FIG. 2 is a block diagram of the signal processor 300 illustrated in FIG. 1. Referring to FIG. 2, the signal processor 300 includes an optical detector 301, comparators 303a, 303b, 303c and 303d, phase detectors 304a and 304b, and an integrator 305.

In a tracking signal generating method based on a DPD process, signals A, B, C and D received by the optical pickup 200 are sent to the optical detector 301, amplified by an amplifier (not shown) and then transferred to comparators 303a through 303d. Comparators 303a through 303d compare the signals A, B, C and D with a reference value and generate square wave signals INA, NB, INC and IND.

The phase detectors 304a and 304b detect phase differences between the square wave signals INA, INB, INC and IND, that is, a phase difference between the signal INA and the signal INB and a phase difference between the signal INC and the signal IND. The integrator 305 integrates the detected phase differences and generates a tracking signal (hereinafter, referred to as a DPD tracking signal) based on the DPD process.

If switches 302 are open, a four-channel type DPD tracking signal is generated. If the switches 302 are closed, a two-channel type DPD tracking signal is generated. In order to generate the DPD tracking signal, the phase detectors 304a and 304b use a SR latch method and a D flip flop method. Therefore, the phase detectors 304a and 304b normally operate when a pulse type signal is received.

However, if the signals INA, INB, INC and IND are DC signals, i.e., if signals fixed to a high or low level are input to the phase detectors 304a and 304b, the outputs of the phase detectors 304a and 304b are fixed according to the previous states of the signals INA, INB, INC and IND, as shown in Table 1.

If each phase detector 304a and 304b is a D flip flop type, the output value cannot be estimated. This is because the output value of each phase detector 304a and 304b is fixed according to the level of a signal which has been input to the phase detectors 304a and 304b in synchronization with a previous clock signal. Accordingly, this inability to estimate the output value deteriorates the stability of the optical reproducing apparatus.

TABLE 1

| | | D flip flop | | SR latch | |
|---|---|---|---|---|---|
| INA | INB | UP | DOWN | UP | DOWN |
| Low | Low | — | — | Low | Low |
| Low | High | — | — | High | Low |
| High | Low | — | — | Low | High |
| High | High | — | — | Low | Low |

There are several possibilities that when a DC signal is input to the phase detectors 304a and 304b, the tracking servo operation of the optical reproducing apparatus may be unstable. This could occur when the system is initialized, when a defect area or a burst cutting area (BCA) of the disc is reproduced, etc.

The BCA is provided in the inner area of the disc for copyright protection, a serial number, etc. In the defect and BCA areas, since little or no tracking signal is generated in this area and thus a DC component is input to the phase detectors 304a and 304b, the tracking servo operation of the optical reproducing apparatus becomes unstable.

Typically, to solve the problem, a conventional method of preventing the instability of a tracking servo operation is used. In the conventional method, an offset is controlled when an optical reproducing apparatus is initialized, or the previous output of a controller is held using a servo hold filer when a defect is found.

However, the conventional methods may have problems in that a time delay occurs while the previous output is held, and no area information is obtained in a BCA. Therefore, the tracking servo operation becomes unstable.

SUMMARY OF THE INVENTION

An example embodiment of the present invention is directed to a tracking signal generating apparatus. The apparatus includes a phase detector generating an up signal and a down signal. Each of the up signal and down signal may indicate a phase difference between a plurality of square wave signals generated from an optical signal. The apparatus includes a digital phase controller generating one of a given up limit signal and a given down limit signal whose logic levels are controlled, so that a phase difference between the up limit signal and down limit signal is reduced.

Another example embodiment of the present invention is directed to a digital phase controller. The digital phase controller includes a reference time determining unit determining a reference time based on a clock signal and a first control signal, and outputting a second control signal at a first level if one of the up signal and the down signal is fixed to a constant logic level over a determined reference time. The digital phase controller includes a controller performing an Exclusive OR operation on the up signal and down signal, applying the result to the reference time determining unit, and generating a given up limit signal and a given down limit signal in response to the second control signal.

Another example embodiment of the present invention is directed to a method of generating limit signals to stabilize a tracking signal for an optical reproduction device. In the method, an up signal and a down signal is generated, with each indicating a phase difference between a plurality of square wave signals generated from an optical signal. One of a given up limit signal and a given down limit signal whose logic levels are controlled is generated, so that a phase difference between the up limit signal and down limit signal is reduced.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of example embodiments therein.

DETAILED DESCRIPTION OF THE EXAMPLE EMBODIMENTS

Figure 1:
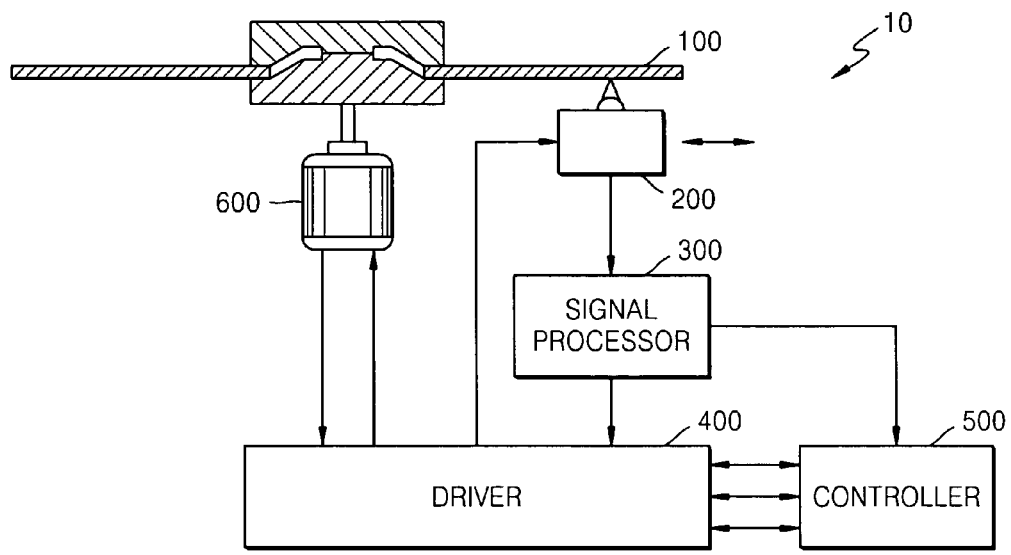
FIG. 1 is a schematic view of an optical reproducing apparatus.
Figure 2:
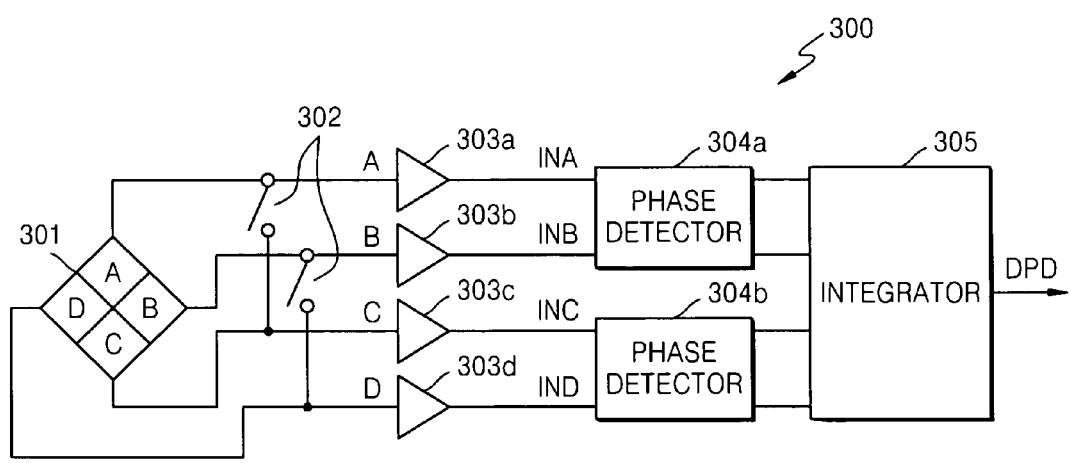
FIG. 2 is a block diagram of a signal processor illustrated in FIG. 1.

The present invention will now be described more fully with reference to the accompanying drawings, in which example embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their descriptions will not be repeated.

Example embodiments of the present invention as to be described in detail hereafter are directed to a tracking signal generating apparatus which is capable of stably generating a tracking signal when no reproduction information is detected on a specific reproduction area of an optical reproducing apparatus.

Figure 3:
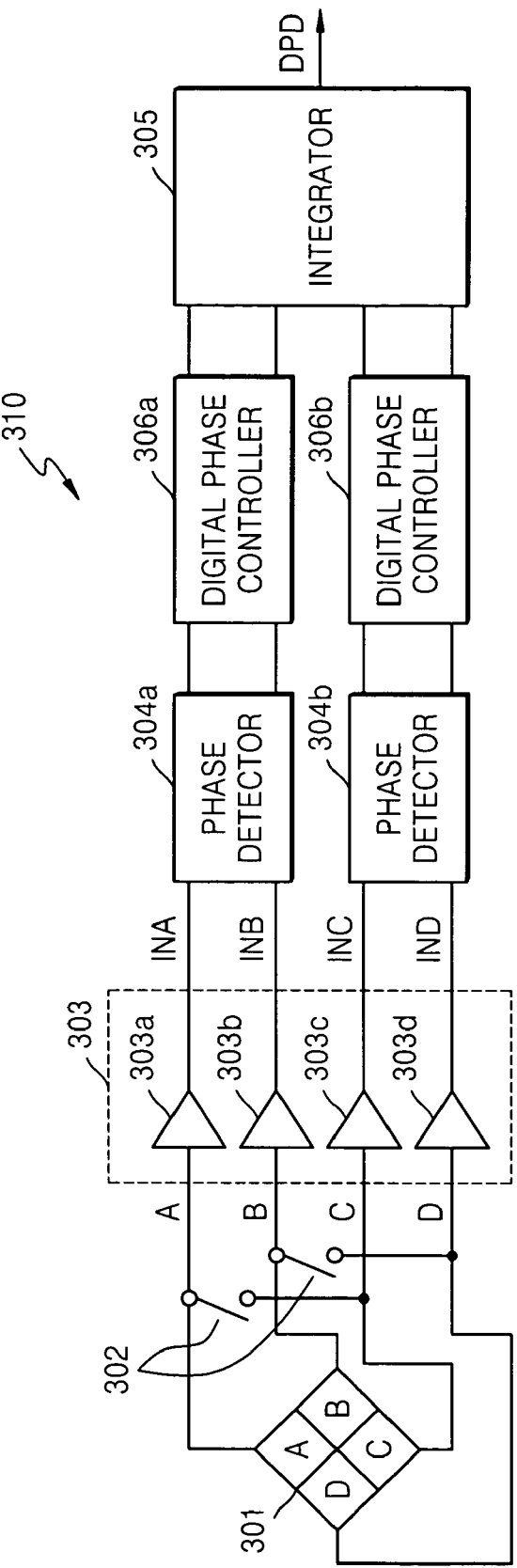
FIG. 3 is a block diagram of a tracking signal generating apparatus according to an example embodiment of the present invention.

FIG. 3 is a block diagram of a tracking signal generating apparatus according to an example embodiment of the present invention. Referring to FIG. 3, tracking signal generating apparatus 310 which operates based on a DPD method includes an optical detector 301, one or more switches 302, a comparing unit 303, phase detectors 304a and 304b, digital phase controllers 306a and 306b and an integrator 305.

The optical detector 301 detects an optical signal reflected from an optical storage medium (not shown). The optical detector 301 may be a 4-division type. The comparing unit 303 includes comparators 303a through 303d which are provided by the same number as that of sine wave signals A, B, C and D output from the optical detector 301. The sine wave signals A, B, C and D are transferred to the comparators 303a through 303d, compared with a given reference value by comparators 303a through 303d, and then output as square wave signals INA, INB, INC and IND. Each phase detectors 304a and 304b detects a phase difference between a corresponding two of the square wave signals INA, INB, INC and IND. Each phase detector 304a, 304b generates an up signal and a down signal which contain information regarding the phase differences between the square wave signals INA, INB, INC and IND.

If the square wave signals INA, INB, INC and IND are pulse type signals, the up and down signals that represent output signals of the phase detectors 304a and 304b normally pass with original waveforms through the digital phase controllers 306a and 306b. However, if the square wave signals INA, INB, INC and IND are DC signals due to some defect, etc., the up and down signals output from phase detectors 304a and 304b are varied by the digital phase controllers 306a and 306b.

For example, if one of the input wave signals INA, INB, INC and IND is fixed to a constant logic level during over a given reference time, the digital phase controllers 306a and 306b generate a given up limit signal (not shown) and a given down limit signal (not shown) whose logic levels are adjusted so that the phase difference between the up limit signal and the down limit signal is relatively small.

However, the digital phase controllers 306a and 306b output an up limit signal and a down limit signal having the same waveforms as the up and down signals, if signals input to the phase detectors 304a and 304b are fixed to a constant logic level within the given reference time.

Then, the integrator 305 integrates the outputs of the digital phase controllers 306a and 306b to generate a tracking error signal DPD. The tracking error signal DPD is input to the controller 500 to enable the optical pickup 200 to correctly follow a track along which information is recorded in the optical reproducing apparatus.

In FIG. 3, if the switches 302 are closed, the tracking signal generating apparatus 310 is arranged as a two-channel type, thus a sine signal A+C and a sine signal B+D of the optical detector 301 are transferred to the comparators 303a and 303b. If the switches 302 are open, the tracking signal generating apparatus 310 is arranged as a four-channel type. Thus, sine signals A, B, C and D are respectively transferred to the comparators 303a, 303b, 303c and 303d.

The digital phase controller 306a includes active elements, such as clock generators (not shown), D flip flops (not shown) and so on. This is because the size of a semiconductor chip significantly increases and dependency on manufacturing processes increases if the digital phase controller 306a includes passive elements, such as capacitors, digital/analog converters and so on.

Figure 4:
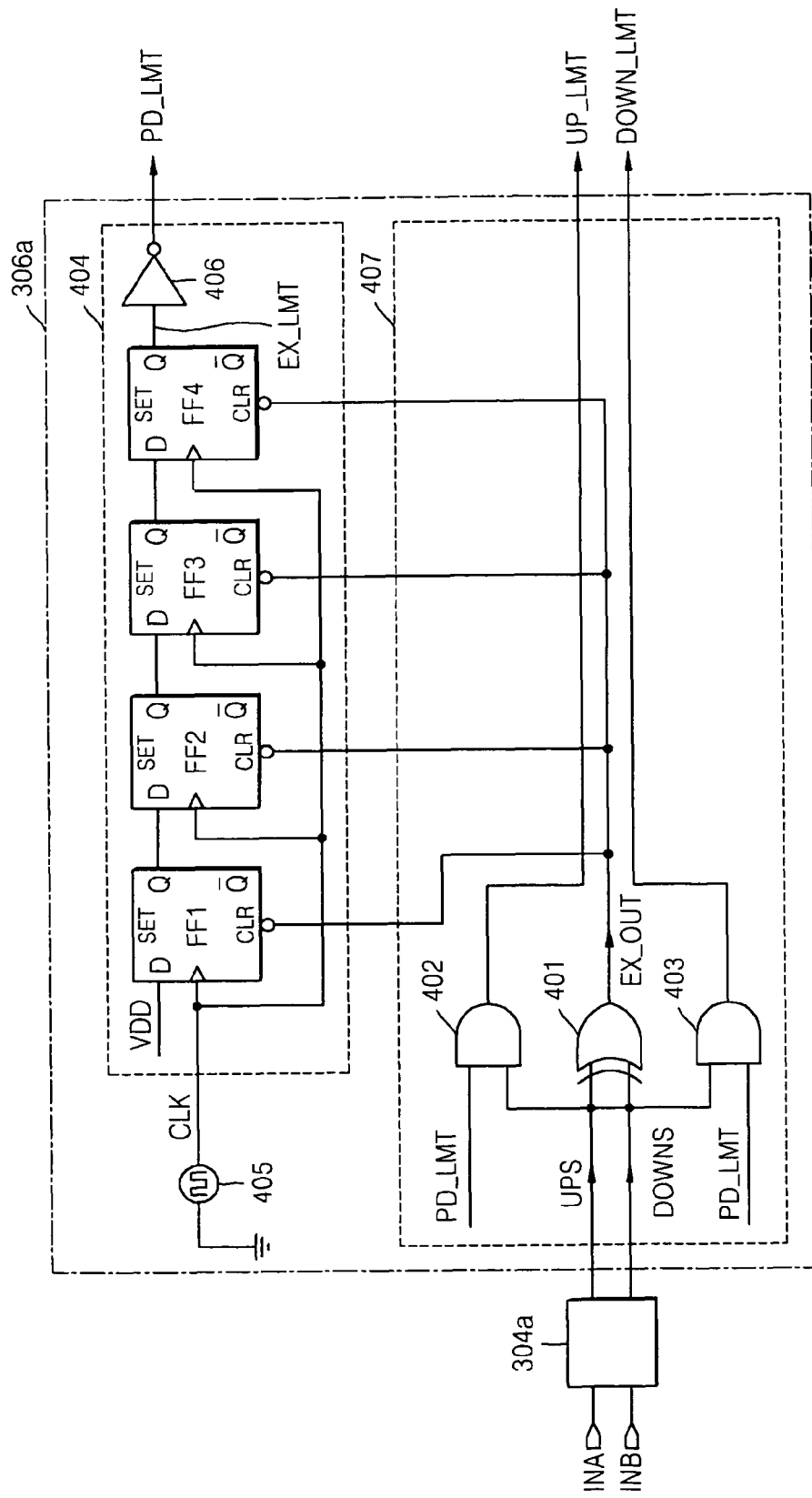
FIG. 4 is a circuit diagram of a digital phase controller illustrated in FIG. 3.

FIG. 4 is a circuit diagram of the digital phase controller 306a illustrated in FIG. 3. Since the digital phase controllers 306a and 306b have the same configuration, operation and configuration of digital phase controller 306a will be described below for purposes of brevity.

The digital phase controller 306a includes a reference time deciding unit 404 and a controller 407. The reference time deciding unit 404 decides a reference time in response to a clock signal CLK and a first control signal VDD, and outputs a second control signal PD_LMT of a first level if one of a up signal UPS and a down signal DOWNS is fixed to a constant logic level over the reference time. For convenience of description, it is assumed that the first level is low; however, the example embodiments are not so limited.

The controller 407 performs an Exclusive OR operation of the up signal UPS and the down signal DOWNS, applies the result to the reference time deciding unit 404, and generates an up limit signal UP_LMT and a down limit signal DOWN_LMT in response to the second control signal PD_LMT. For example, the controller 407 includes an Exclusive OR gate 401 and first and second AND devices 402 and 403.

The Exclusive OR gate 401 performs an Exclusive OR operation of the up signal UPS and the down signal DOWNS and applies the result to the reference time deciding unit 404. The first AND device 402 performs an AND operation of the second control signal PD_LMT and the up signal UPS and generates the up limit signal UP_LMT. The second AND device 403 performs an AND operation of the second control signal PD_LMT and the down signal DOWNS and generates the down limit signal DOWN_LMT.

The reference time deciding unit 404 includes a plurality of flip flops FF1 through FF4 and an inverter 406. The plurality of flip flops FF1 through FF4, which are connected in series to each other, are synchronized with a clock signal CLK and receive the output of the Exclusive OR gate 401 through the respective reset terminals CLR.

A first control signal VDD is input to the input terminal D of the first flip flop FF1 of the flip flops FF1 through FF4. The reference time is determined based on the number of the flip flops FF1 through FF4. In FIG. 4, four flip flops FF1 through FF4 are used, however, the example embodiments are not so limited.

The flip flops FF1 through FF4 may be D flip flops. The inverter 406 inverts the output of the final flip flop FF4 of the flip flops FF1 through FF4 and generates the inverted result as the second control signal PD_LMT.

Figure 5:
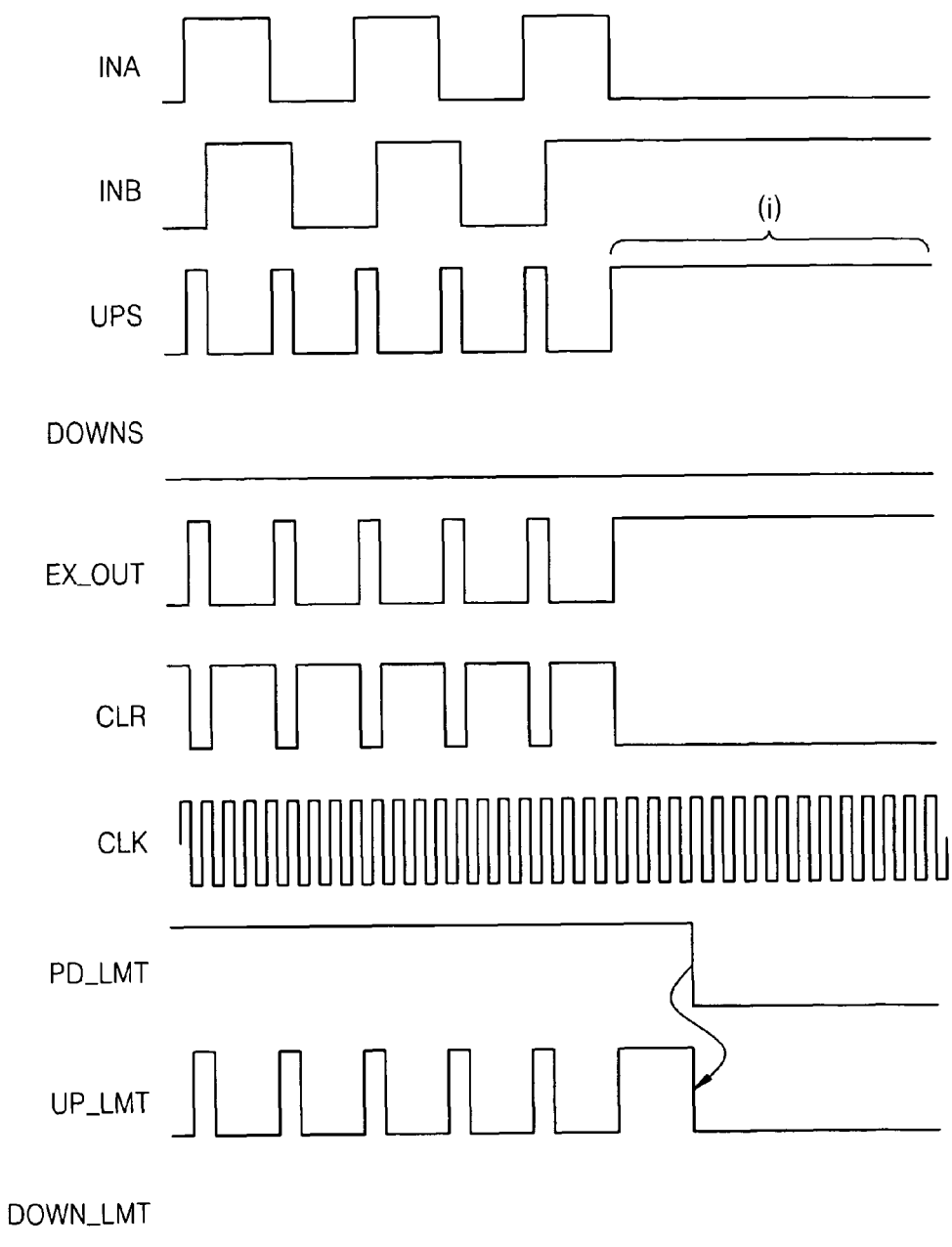
FIG. 5 is a timing diagram for explaining the operation of a digital phase controller shown in FIG. 4.

FIG. 5 is a timing diagram for explaining the operation of the digital phase controller 306a shown in FIG. 4. Referring to FIGS. 4 and 5, in operation an up signal UPS and a down signal DOWNS output from the phase detector 304a is transferred to the Exclusive OR gate 401 and the input terminals of the first and second AND devices 402 and 403. The up signal UPS and the down signal DOWNS each contain information regarding a phase difference between square wave signals INA and INB output from the comparators 303a and 303b.

An output EX_OUT of the Exclusive OR gate 401 is inverted and transferred to the reset terminals CLR of the flip flops FF1 through FF4, an output of the clock generator 405 is input to the clock input terminals of the flop flops FF1 through FF4, and a first control signal VDD is input to the input terminal D of the flip flop FF1.

The first control signal VDD has a second level. For convenience of description, it is assumed that the second level is high, however, the example embodiments are not so limited.

An output of the flip flop FF4 is transferred as a second control signal PD_LMT to the respective input terminals of the first and second AND devices 402 and 403 via the inverter 406. The first control signal VDD is delayed by a delay time determined according to the frequency of the clock generator 405 and the number of the flip flops FF1 through FF4. If the input signals INA and INB of the phase detector 304a are pulse type signals, and the up signal UPS and the down signal DOWNS are pulse type signals, the up signal UPS and the down signal DOWNS normally pass with the original waveform through the digital phase controller 306a. However, if a DC signal is input to the phase detector 304a, a phase difference between the up signal UPS and the down signal DOWNS may increase excessively.

Referring to FIG. 5, a phase difference between the square wave signals INA and INB appears as an up signal UPS. That is, the phase difference between the square wave signals INA and INB is reflected to the up signal UPS or the down signal DOWNS based on the circuit configuration of the phase detector 304a, with and the other signal going to low.

In FIG. 5, the phase difference between the square signals INA and INB is reflected to the up signal UPS. That is, the phase of the square signal INA slightly precedes that of the square signal INB, and the phase difference between the square signals INA and INB appears as the up signal UPS.

In normal operation, as shown as a waveform of the reset terminal CLR in FIG. 5, if a high level signal is input to the reset terminal CLR, the flip flops FF1 through FF4 are reset and the first control signal VDD does not pass through the flip flops FF1 through FF4. Thus, the output EX_LMT of the flip flop FF4 goes to low and the second control signal PD_LMT remains at a high level by the inverter.

Although the flip flops FF1 through FF4 operate when a signal input to the reset terminal CLR changes to low, since a signal input to the reset terminal CLR goes to high before the first control signal VDD passes through the flip flops FF1 through FF4, the flip flops FF1 through FF4 are again reset and the second control signal PD_LMT remains in a high level.

However, if one of the square wave signals INA and INB is fixed to low or high over a reference time, an up signal UPS, which reflects a phase difference between the square wave signals INA and INB, is also fixed to high (see (i) of FIG. 5).

Thus, an up signal UPS at a high level and a down signal DOWNS at a low level are input to the Exclusive OR gate 401 of the controller 407. Accordingly, an output EX_OUT of the Exclusive OR gate 401 goes to high and the inverted signal (low level) of the output EX_OUT is input to the reset terminals CLR of the flip flops FF1 through FF4.

In this case, a first control signal VDD input to the flip flops FF1 through FF4 is delayed by a delay time decided according to the number of the flip flops FF1 through FF4 and the frequency of a clock signal CLK. The delayed first control signal VDD is inverted and output as a second control signal PD_LMT at a low level.

The second control signal PD_LMT is input to the first and second AND devices 402 and 403. In a normal operation, the up limit signal UP_LMT has the same waveform as the up signal UPS shown in FIG. 5.

The first AND device 402 performs an AND operation of the up signal UPS and the second control signal PD_LMT at the low level and generates an up limit signal UP_LMT at a low level.

In other words, in order to solve a problem that the integral value of the output signal from the digital phase controller 306a continuously increases due to a continuous increase in the phase difference between output signals of the phase detector 304a in a defect area, etc., the digital phase controller 306a compulsorily changes the logic level of the output signal. For example, digital phase controller 306a may be adapted to change the up limit signal UP_LMT in the example embodiment of FIGS. 4 and 5, that is input to the integrator 305 to a low level, if the up signal UPS or the down signal DOWNS is fixed to a constant level over a reference time determined by the number of the flip flops FF1 through FF4. Accordingly, the output (i.e., a value of a tracking signal DPD) of the integrator 305 for integrating the phase difference between the up limit signal UP_LMT and the down limit signal DOWN_LMT is reduced.

Therefore, the tracking signal generating apparatus according to the example embodiments of the present invention may stably perform a tracking servo operation by removing the DC components of a tracking signal which could be generated when a defect area or a burst cutting area (BCA) on an optical recording medium is reproduced, or when a system is initialized without any reproduction information.

While the present invention has been particularly shown and described with reference to example embodiments thereof, it will be understood by those of ordinary skill in the art that various changes in form and details may be made therein without departing from the spirit and scope of the example embodiments of the present invention as defined by the following claims.

What is claimed is:

1. A tracking signal generating apparatus, comprising:
a phase detector generating an up signal and a down signal, each indicating a phase difference between a plurality of square wave signals generated from an optical signal, and
a digital phase controller generating one of a given up limit signal and a given down limit signal whose logic levels are controlled, so that a phase difference between the up limit signal and down limit signal is reduced, wherein
the phase difference is reduced if one of the square wave signals is fixed at a constant logic level over a given reference time period, and
a duration of the given reference time period is determined independently of the phase difference.

2. The apparatus of claim 1, further comprising an optical detector detecting the optical signal as reflected from an optical storage medium so as to output a plurality of sine signals.

3. The apparatus of claim 2, further comprising a comparing unit comparing the output sine signals to a reference value to generate the plurality of square wave signals.

4. The apparatus of claim 2, wherein one of the up signal and down signal is fixed at a constant logic level over the given reference time period, when a defect area or a burst cutting area (BCA) of the optical storage medium is reproduced or when the optical storage medium is in an initial stage of reproduction.

5. The apparatus of claim 3, wherein the optical detector is a four-division type, and
wherein the comparing unit includes a plurality of comparators equal in number to the number of sine signals output thereto.

6. The apparatus of claim 1, wherein a single phase detector is provided if the apparatus is a two-channel type, else two phase detectors are provided if the apparatus is a four-channel type.

7. The apparatus of claim 1, wherein the digital phase controller outputs the up limit signal and the down limit signal with the same waveforms as its corresponding up signal and down signal, if the up signal and down signal are fixed at the constant logic level during the given reference time period.

8. The apparatus of claim 1, wherein the digital phase controller includes:
a reference time determining unit determining the given reference time period based on a clock signal and a first control signal, and outputting a second control signal at a first level if one of the up signal and down signal is fixed to a constant logic level over the given reference time period, and
a controller performing an Exclusive OR operation on the up signal and down signal, applying the result to the reference time determining unit, and generating the up limit signal and the down limit signal in response to the second control signal.

9. The apparatus of claim 8, wherein the controller includes:
an Exclusive OR gate performing an Exclusive OR operation on the up signal and down signal and applying the result to the reference time determining unit,
a first AND device performing an AND operation on the second control signal and the up signal to generate the up limit signal, and
a second AND device performing an AND operation on the second control signal and down signal to generate the down limit signal.

10. The apparatus of claim 9, wherein the reference time determining unit includes:
a plurality of flip flops synchronized with the clock signal, having a plurality of reset terminals receiving an output of the Exclusive OR gate, and connected in series to each other to form a serial chain, and
an inverter inverting an output of a final flip flop in the serial chain to generate the inverted result as the second control signal,
wherein the first control signal is input to an input terminal of a first flip flop in the serial chain, and the given reference time period is determined based on the number of flip flops in the chain.

11. The apparatus of claim 10, wherein each of the flip flops in the chain is a D flip flop, and
wherein the first control signal has a second level.

12. The apparatus of claim 1, further comprising an integrator integrating the up limit signal and the down limit signal output from the digital phase controller.

13. A digital phase controller, comprising:
a reference time determining unit determining whether a given reference time period has been exceeded based on a clock signal and a first control signal, and outputting a second control signal at a first level if one of an up signal and a down signal is fixed to a constant logic level over the given reference time period, and
a controller generating the first control signal in response to performing an Exclusive OR operation on the up signal and down signal and generating a given up limit signal and a given down limit signal in response to the second control signal.

14. The digital phase controller of claim 13, wherein the controller outputs the up limit signal and the down limit signal with the same waveforms as its corresponding up signal and down signal, if one of the up signal and down signal are fixed at the constant logic level during the given reference time period.

15. The digital phase controller of claim 13, wherein the controller includes:
an Exclusive OR gate performing an Exclusive OR operation on the up signal and down signal and applying the result to the reference time determining unit,
a first AND device performing an AND operation on the second control signal and the up signal to generate the up limit signal, and
a second AND device performing an AND operation on the second control signal and down signal to generate the down limit signal.

16. The digital phase controller of claim 13, wherein the reference time determining unit includes:

a plurality of flip flops synchronized with the clock signal, having a plurality of reset terminals receiving an output of the Exclusive OR gate, and connected in series to each other to form a serial chain, and an inverter inverting an output of a final flip flop in the serial chain to generate the inverted result as the second control signal, wherein the first control signal is input to an input terminal of a first flip flop in the serial chain, and the given reference time period is determined based on the number of flip flops in the chain.

17. The digital phase controller of claim 16, wherein each of the flip flops in the chain is a D flip flop, and wherein the first control signal has a second level.

18. The digital phase controller of claim 13, wherein the up signal and the down signal indicate a phase difference between a plurality of square wave signals generated by converting an optical signal reflected from an optical storage medium.

19. The digital phase controller of claim 18, wherein one of the up signal and down signal is fixed at a constant logic level over the given reference time period, when a defect area or a burst cutting area (BCA) of the optical storage medium is reproduced or when the optical storage medium is in an initial stage of reproduction.

20. A method of generating limit signals to stabilize a tracking signal for an optical reproduction device, comprising:

generating an up signal and a down signal, each indicating a phase difference between a plurality of square wave signals generated from an optical signal, and generating one of a given up limit signal and a given down limit signal whose logic levels are controlled so that a phase difference between the up limit signal and down limit signal is reduced, wherein the phase difference is reduced if one of the square wave signals is fixed at a constant logic level over a given reference time period, and a duration of the given reference time period is determined independently of the phase difference.

21. The method of claim 20, further comprising:

detecting the optical signal as reflected from an optical storage medium, and outputting a plurality of sine signals from the detection.

22. The method of claim 21, further comprising:

comparing the output sine signals to a reference value, and generating the plurality of square wave signals based on the comparison.

23. The method of claim 20, wherein generating one of the up limit and down limit signals includes outputting the up limit and down limit signals with the same waveforms as its corresponding up and down signals, if the up signal and down signal are fixed at a constant logic level over the given reference time period.

* * * * *